US009536060B2

(12) United States Patent
Lemelev et al.

(10) Patent No.: US 9,536,060 B2
(45) Date of Patent: Jan. 3, 2017

(54) NETWORK INFORMATION SYSTEM WITH LICENSE REGISTRATION AND METHOD OF OPERATION THEREOF

(71) Applicant: ClevX, LLC, Kirkland, WA (US)

(72) Inventors: Alex Lemelev, Maple (CA); Lev M. Bolotin, Kirkland, WA (US)

(73) Assignee: ClevX, LLC, Kirkland, WA (US)

( * ) Notice: Subject to any disclaimer, the term of this patent is extended or adjusted under 35 U.S.C. 154(b) by 0 days.

(21) Appl. No.: 14/624,879

(22) Filed: Feb. 18, 2015

(65) Prior Publication Data

US 2015/0319148 A1     Nov. 5, 2015

Related U.S. Application Data

(60) Provisional application No. 61/988,194, filed on May 3, 2014.

(51) Int. Cl.
*H04L 29/06* (2006.01)
*G06F 21/10* (2013.01)
*H04L 29/08* (2006.01)

(52) U.S. Cl.
CPC .......... *G06F 21/10* (2013.01); *G06F 21/105* (2013.01); *H04L 63/06* (2013.01); *H04L 67/34* (2013.01)

(58) Field of Classification Search
CPC ...................................................... H04L 63/06
USPC .......................................................... 726/30
See application file for complete search history.

(56) References Cited

U.S. PATENT DOCUMENTS

| 8,463,814 B2 * | 6/2013 | Terranova | G06F 21/10 380/201 |
| 8,613,082 B2 * | 12/2013 | Aono | G06F 21/105 726/21 |
| 2004/0059938 A1 | 3/2004 | Hughes et al. | |
| 2006/0143135 A1 | 6/2006 | Tucker et al. | |
| 2006/0218649 A1 * | 9/2006 | Brickell | G06F 21/572 726/27 |
| 2008/0262968 A1 | 10/2008 | Saxena et al. | |
| 2009/0037337 A1 | 2/2009 | Baitalmal et al. | |
| 2010/0031373 A1 | 2/2010 | Hamid | |
| 2011/0093943 A1 | 4/2011 | Nakagawa et al. | |

(Continued)

FOREIGN PATENT DOCUMENTS

KR     20120051662 A     5/2012

OTHER PUBLICATIONS

International Search Report for PCT No. PCT/US15/23718 dated Jun. 15, 2015.

*Primary Examiner* — Longbit Chai
(74) *Attorney, Agent, or Firm* — Schwegman Lundberg & Woessner, P.A.

(57) ABSTRACT

A network information system, and a method of operation thereof, includes: an extraction module for extracting a unique device identification for sending to an e-commerce server, wherein the unique device identification is extracted from a network-connected device with a software application installed and not activated on the network-connected device; a settlement process module, coupled to the extraction module, for generating a notification based on the unique device identification for sending to a license server; and a key generation module, coupled to the settlement process module, for generating a product key for the unique device identification based on the notification for activating the software application to run on a computing device.

25 Claims, 5 Drawing Sheets

(56) References Cited

U.S. PATENT DOCUMENTS

2011/0307885 A1   12/2011  Cushion et al.
2012/0124378 A1*  5/2012  Chang .................. H04L 9/0891
                                             713/172

* cited by examiner

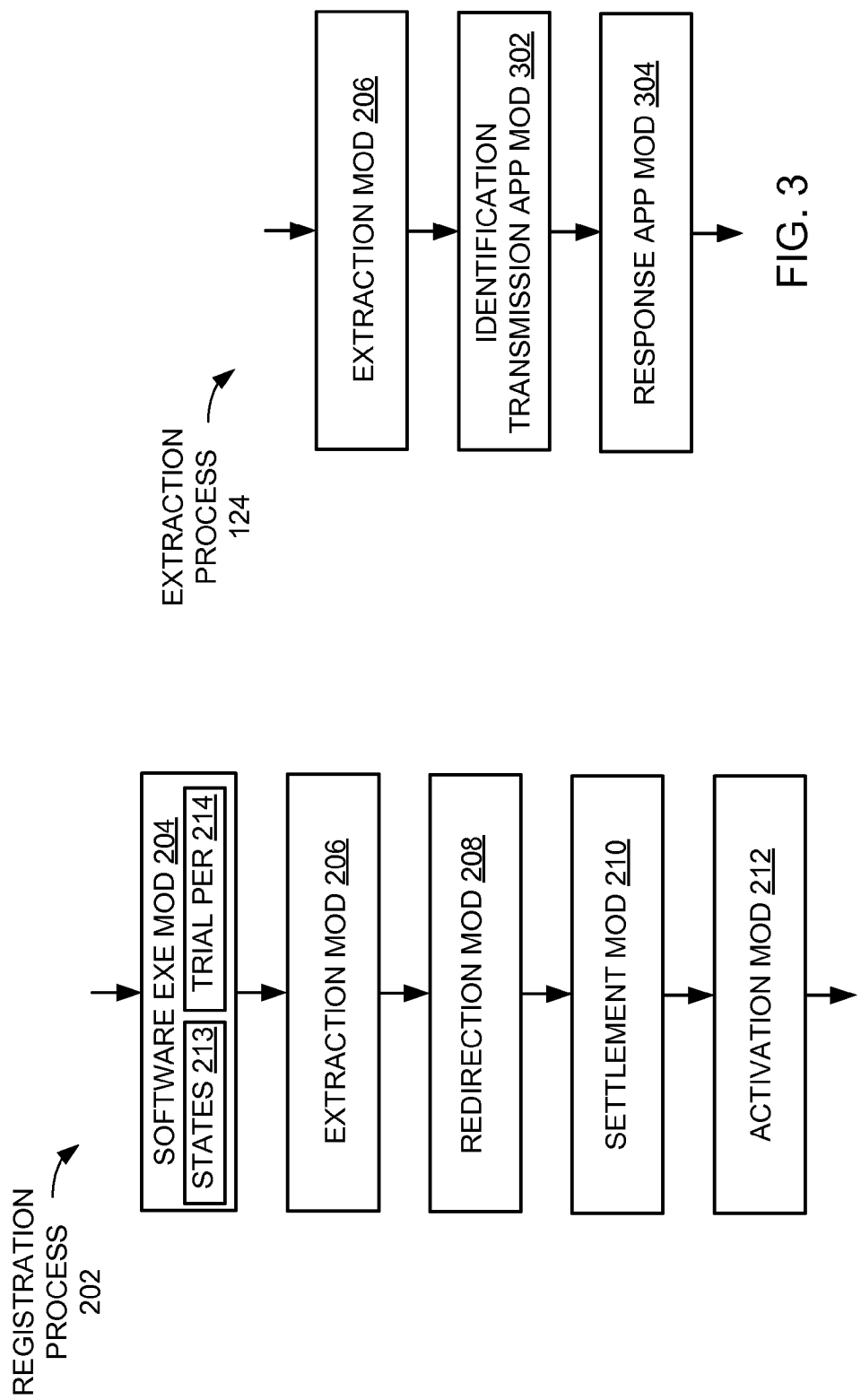

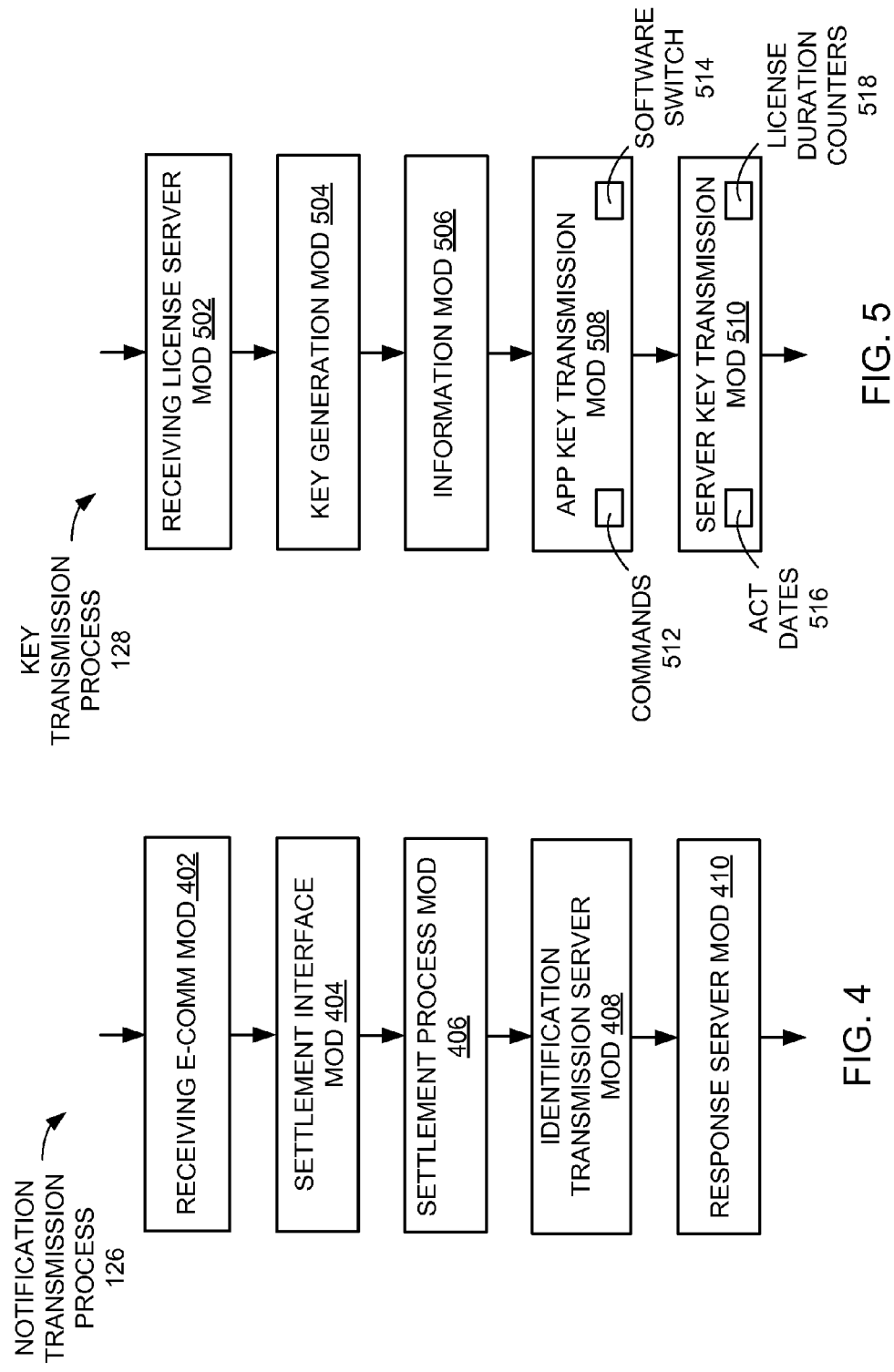

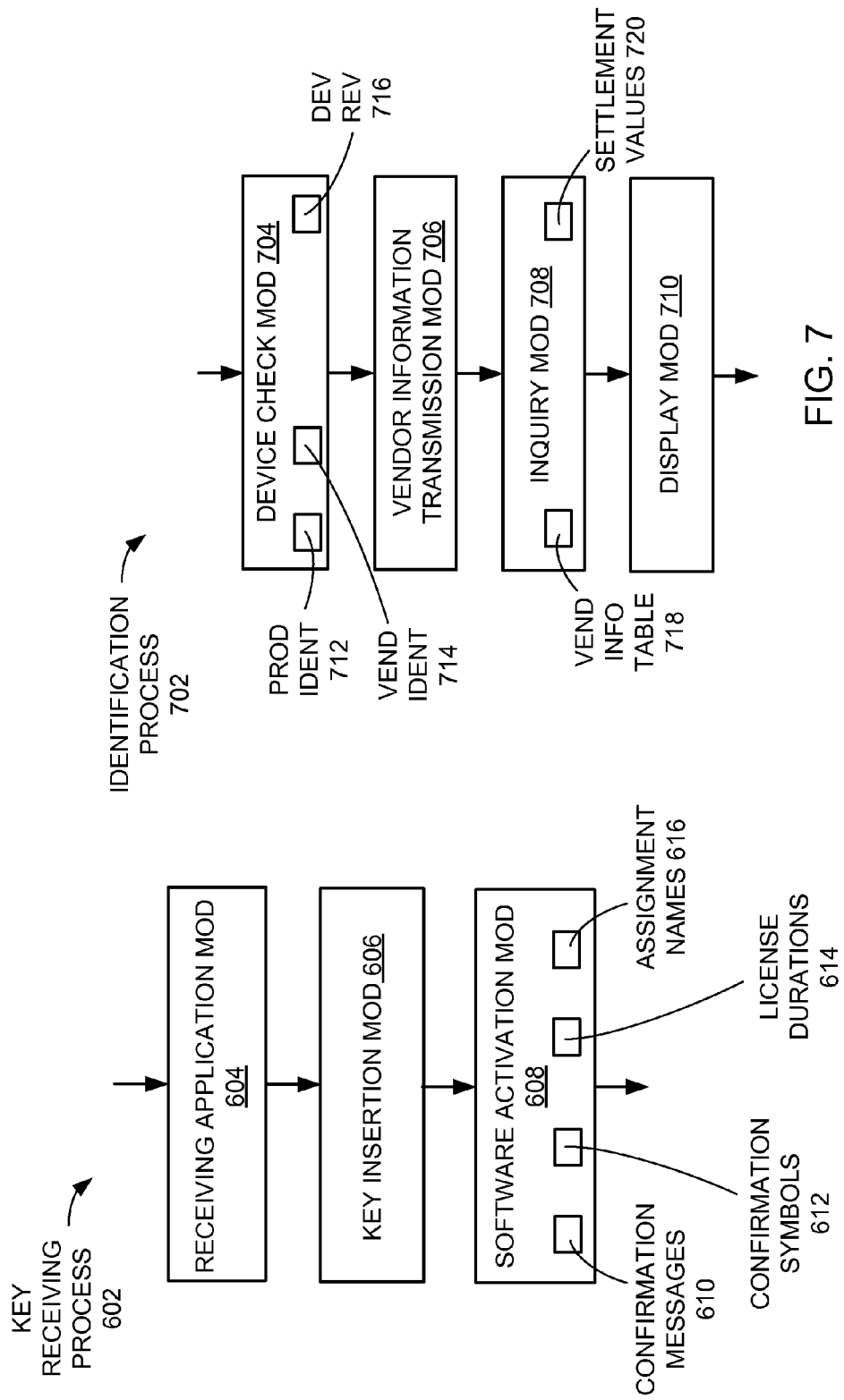

718 ⟶

| PID | VID | REV | SETTLE VALUES | LICENSE DURATIONS |
|---|---|---|---|---|
| 1603 | 9051 | ANY | $12.50 | 1 YEAR |
| 1603 | 9051 | 19Q1 | $12.00 | 2 YEARS |
| 1603 | 9052 | 12Q3 | $19.99 | 5 YEARS |
| ANY OTHER PID | ANY OTHER VID | ANY OTHER REV | $15.00 | 1 YEAR |

712 → PID
714 → VID
716 → REV
720 → SETTLE VALUES
614 → LICENSE DURATIONS

FIG. 8

METHOD 900

EXTRACTING 902
↓
GENERATING A NOTIFICATION 904
↓
GENERATING A PRODUCT KEY 906

FIG. 9

NETWORK INFORMATION SYSTEM WITH LICENSE REGISTRATION AND METHOD OF OPERATION THEREOF

CROSS-REFERENCE TO RELATED APPLICATION(S)

This application claims the benefit of U.S. Provisional Patent Application Ser. No. 61/988,194 filed May 3, 2014, and the subject matter thereof is incorporated herein by reference thereto.

TECHNICAL FIELD

The present invention relates generally to a computing system, and more particularly to a system for computing with software license.

BACKGROUND

An inactivated product can usually act as a time-limited trial until a product key is purchased. The product key can also be known as a license key or an activation key. The product key can be used to activate software, for example, to license the software for authorized use or license registration.

A software vendor can typically send a unique license key to an end-user by an e-mail. For a deployment within an organization, a software vendor can typically send a list of license keys to an information technology (IT) manager of the organization for internal distribution and management.

When the user installs a software package or a software application, a software interface can request that the user enter the license keys to activate the software package. In some cases, the user can be able to copy the license keys from the e-mail and paste the license keys into the software interface. In some other cases, the software interface can prevent a paste function and the user has to manually type the license keys into the software interface.

There are a number of problems with existing methods of distributing authorized license keys. One of the problems is that the existing methods are inconvenient for the user. The existing methods create confusion and loss of time and productivity, especially for corporate deployments. The existing methods can include a tedious process that may involve waiting for the e-mail from the software vendor, locating the license keys in an e-mail text, and then correctly entering the license keys into the software interface.

Another of the problems is that entering the license keys is also prone to human errors. Thus, it has been noted that earlier methods or the existing methods are inconvenient and require the user to go through extra steps in order to activate the software application.

Additionally, loss of product keys usually means the software is useless once uninstalled, which not only causes loss of productivity but also additional expense to repurchase the software. The product keys can also present new ways for distribution to go wrong. For example, if a product is shipped with missing or invalid keys, then the entire software package can become useless.

As noted above, the earlier methods are tedious and complicated and cause the loss of time, productivity, and money. Additionally, it takes an ordinary user several complicated steps to find and insert the license keys into the software application using the earlier methods.

Thus, a need still remains for a network information system with license registration. In view of the ever-increasing commercial competitive pressures, along with growing consumer expectations, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

Embodiments of the present invention provide a method of operation of a network information system, including: extracting a unique device identification for sending to an e-commerce server, wherein the unique device identification is extracted from a network-connected device with a software application installed and not activated on the network-connected device; generating a notification based on the unique device identification for sending to a license server; and generating a product key for the unique device identification based on the notification for activating the software application to run on a computing device.

The embodiments of the present invention provide a network information system, including: an extraction module for extracting a unique device identification for sending to an e-commerce server, wherein the unique device identification is extracted from a network-connected device with a software application installed and not activated on the network-connected device; a settlement process module, coupled to the extraction module, for generating a notification based on the unique device identification for sending to a license server; and a key generation module, coupled to the settlement process module, for generating a product key for the unique device identification based on the notification for activating the software application to run on a computing device.

Certain embodiments of the present invention have other steps or elements in addition to or in place of those mentioned above. The steps or the elements will become apparent to those skilled in the art from a reading of the following detailed description when taken with reference to the accompanying drawings.

BRIEF DESCRIPTION OF THE DRAWINGS

FIG. 2 is a flow chart of a registration process of the network information system of FIG. 1.

FIG. 3 is a flow chart of the extraction process of the network information system of FIG. 1.

FIG. 4 is a flow chart of the notification transmission process of the network information system of FIG. 1.

FIG. 5 is a flow chart of the key transmission process of the network information system of FIG. 1.

FIG. 6 is a flow chart of a key receiving process of the network information system of FIG. 1.

FIG. 7 is a flow chart of an identification process of the network information system of FIG. 1.

FIG. 8 is an example of the vendor information table.

FIG. 9 is a flow chart of a method of operation of a network information system in a further embodiment of the present invention.

BEST MODE FOR CARRYING OUT THE INVENTION

Figure 1:
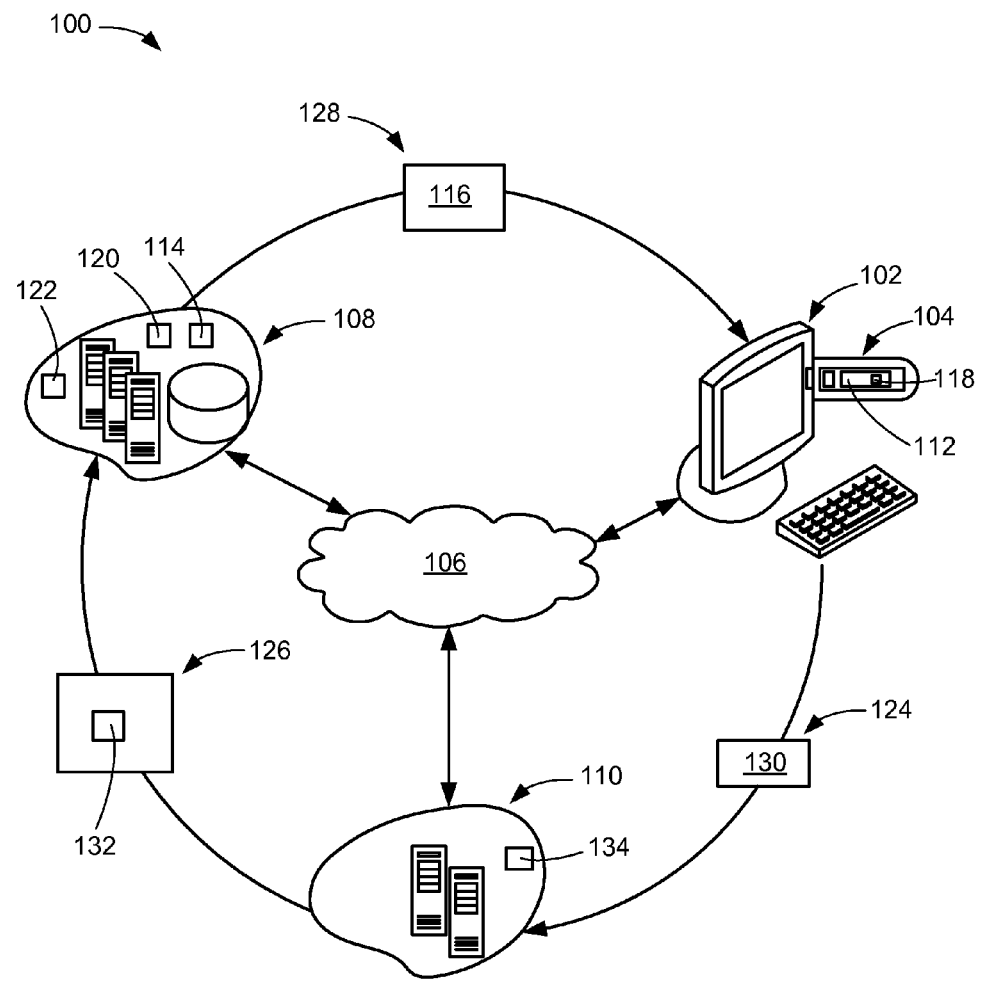
FIG. 1 is a network diagram of a network information system in an embodiment of the present invention.

The following embodiments are described in sufficient detail to enable those skilled in the art to make and use the invention. It is to be understood that other embodiments would be evident based on the present disclosure, and that system, process, or mechanical changes can be made without departing from the scope of the embodiments of the present invention.

In the following description, numerous specific details are given to provide a thorough understanding of the invention. However, it will be apparent that the invention can be practiced without these specific details. In order to avoid obscuring the embodiments of the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation.

The term "module" referred to herein can include software, hardware, or a combination thereof in the embodiments of the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

Where multiple embodiments are disclosed and described having some features in common, for clarity and ease of illustration, description, and comprehension thereof, similar and like features one to another will ordinarily be described with similar reference numerals. The embodiments have been numbered second embodiment, first embodiment, etc. as a matter of descriptive convenience and are not intended to have any other significance or provide limitations for the embodiments of the present invention.

Before the embodiments of the present invention are explained in detail, it is to be understood that the embodiments of the present invention are not limited in their application to the details of the examples set forth in the following descriptions or illustrated drawings. The embodiments of the present invention are capable of being practiced or carried out for a variety of applications and in various ways. In addition, it is to be understood that the phraseology and terminology used herein are for the purpose of description and is not to be regarded as limiting.

Before embodiments of software modules or flow charts are described in detail, it is noted that the embodiments of the present invention are not limited to any particular software language described or implied in the figures and that a variety of alternative software languages can be used for implementation of the embodiments of the present invention.

It is also to be understood that many components and items are illustrated and described as if they were hardware elements. However, one of ordinary skill in the art, and based on a reading of this detailed description, would understand that in at least one embodiment, the components comprised in the method and tool can be implemented in part in software.

As will be appreciated by one skilled in the art, the embodiments of the present invention can be embodied as an apparatus, system, or method. Accordingly, the embodiments of the present invention can take the form of an entirely hardware embodiment, a primarily software embodiment (including firmware, resident software, microcode, etc.) or an embodiment combining software and hardware components that may all generally be referred to herein as a circuit, a module, or a system.

Computer program codes for carrying out operations of the embodiments of the present invention can be written in any combination of one or more programming languages, including an object oriented programming language, such as Java, Smalltalk, C++, and conventional procedural programming languages, such as the "C" programming language or similar programming languages. The computer program codes can also be written in dynamic programming languages.

The dynamic programming languages describe a class of high-level programming languages that execute at runtime many common behaviors that other programming languages can perform during compilation. JavaScript and a server-side scripting language including PHP Hypertext Preprocessor (PHP), Perl, Python, and Ruby are examples of the dynamic programming languages.

Additionally, the computer program codes can also be written using a web-programming stack of software, which can include open source software, usually containing an operating system, a Web server, a database server, and a programming language. A number of the embodiments can use open-source Web development platforms using Linux, Apache, MySQL, and PHP. Other examples of environments and frameworks, using which the computer program codes can also be generated, are Ruby on Rails, which is based on the Ruby programming language, or Node.js, which is an event-driven server-side JavaScript environment.

The computer program codes can execute entirely on a user's computer, partly on the user's computer, as a stand-alone software package, partly on the user's computer and partly on a remote computer, or entirely on the remote computer or a server. In the latter scenario, the remote computer can be connected to the user's computer through any type of networks, including a local area network (LAN) or a wide area network (WAN), or a connection can be made to an external computer, for example, through the Internet using an Internet Service Provider.

Network information systems that enable the user to engage with the Internet can include a memory for storing a control program and data, and a processor or a central processing unit (CPU) for executing the control program and for managing the data, which includes user data resident in the memory and buffered content. The computing devices can be coupled to a video display, such as a television, monitor, or other types of visual displays. The computing devices can include the video display incorporated in them.

For example, the computing devices with the video display incorporated therein can include mobile devices, such as iPad, iPhone, or portable devices. Also for example, the network information systems can include personal computers, including laptops or Mac, a Smartphone, a tablet, a Smart TV, etc.

An application, or an app, or other simulation can be stored on a storage media, such as a USB memory key, a flash memory, a Secure Digital (SD) card, a micro-SD card, an Eye-Fi card, a Toshiba FlashAir card, or other types of memory media all collectively referred to as "removable media" in this disclosure. The app can also be downloaded from the Internet. The removable media can be inserted or connected to a console of a computing device where the removable media is read.

The console can then read program instructions stored on the removable media and present a user interface to the user. The user interface can include a graphical user interface (GUI) or a software user interface.

Referring now to FIG. 1, therein is shown a network diagram of a network information system 100 in an embodiment of the present invention. The network information system 100 can include a computing device 102, a network-connected device 104, a network 106, a license server 108, and an e-commerce server 110. The network information system 100 provides a communication mechanism for transferring information among the computing device 102, the network-connected device 104, the license server 108, and the e-commerce server 110 using the network 106.

The network information system 100 can be used for any appliances having software (for example, embedded firmware) with licensing capabilities. For example, the network information system 100 can include any "internet of things", various network-attached-hardware devices, including embedded systems, such as televisions (TV), refrigerators, home automation, etc. Also for example, the network information system 100 can include a computer system, a network-attached device, a removable storage device, a personal computer (PC), a non-removable storage media, a non-storage type device, or a combination thereof.

The computing device 102 provides a method for connectivity of the network-connected device 104. For example, the computing device 102 can represent a computer system including a personal computer (PC).

For example, the network-connected device 104 can include a removable media, such as a Universal Serial Bus (USB) drive, a USB storage device, a USB storage key, an external hard disk drive (HDD), or a solid state drive (SSD). Also for example, the network-connected device 104 can include a removable storage, a removable media, such as a memory card, a memory card reader, or a portable media.

For illustrative purposes, the network-connected device 104 is shown connected to the computing device 102 that is attached to the network 106, although it is understood that the network-connected device 104 can be connected in any configurations. For example, the network-connected device 104 can be attached or directly connected to the network 106, without the computing device 102 directly in between the network-connected device 104 and the network 106. As a specific example, the network-connected device 104 can include a network-connectable storage device.

The network-connected device 104 can be bundled with one or more software applications 112. The software applications 112 can be downloaded from the internet. The software applications 112 may not be activated. The software applications 112 can initially be available in a trial mode or a freemium mode. The users can purchase licenses 114 for the software applications 112 after the software applications 112 have been trialed or tested. For example, the software applications 112 can include embedded software applications running in the network-connected device 104.

The computing device 102 can be connected or attached to the network 106, which enables the computing device 102 to communicate with other entities or devices connected to the network 106. For example, the network 106 can include the Internet or any other connectivity mechanisms. Also for example, the other entities or the other devices can include the license server 108 and the e-commerce server 110.

The software applications 112 that are not activated can be available as a time-limited trial until product keys 116 are purchased and used to activate the software applications 112. The product keys 116 include an encoded unique sequence of alphanumeric characters. The product keys 116 include a specific software-based key for a computer program. The product keys 116 certify that copies of the software applications 112 are original, authorized, or valid.

The product keys 116 can represent a software key, a license key, an activation key, or a product serial number. Activation of the software applications 112 can be done or performed offline by entering the product keys 116. Online activation of a number of the software applications 112 can prevent multiple of the users from using the same license key.

Each of the product keys 116 can include a series or a sequence of alphanumeric characters, such as numbers, letters, or a combination thereof. The sequence can be entered by the users during an installation of computer software or the software applications 112 and then can be passed to a verification function in the program or the software applications 112. The function can manipulate the sequence of the product keys 116 based on a mathematical algorithm and attempt to match results to a set of valid solutions.

The license server 108 can be at a central location on the network 106 where the licenses 114 can be stored and can be accessed by the users on the network 106. The license server 108 is a centralized computer software system, which provides license keys to client computer systems in order to enable licensed software to run on the client computer systems. The license server 108 can represent a software license server.

The users can click on a menu provided by the user interface of the software applications 112 to obtain or purchase the licenses 114. For example, the users can click on an acquisition button 118 on the user interface. For example, the acquisition button 118 can include a "Buy Now" button or other buttons on the user interface that allow the users to purchase the licenses 114. Then, the users can be redirected to the e-commerce server 110, where the users can pay for the licenses 114 of the software applications 112.

Once the users or their sponsors (e.g., companies, IT Managers, etc.) have successfully paid for the licenses 114, the e-commerce server 110 can notify the license server 108. Then, the license server 108 can send messages 120 to the users and/or their sponsors. For example, the messages 120 can include an e-mail or any other form of electronic communication methods.

The messages 120 can include the product keys 116. The users can locate the product keys 116 in the messages 120 received from the license server 108. Then, the users can input the product keys 116 correctly into the software interface to activate the licenses 114.

Once the product keys 116 are entered into a software package or the software applications 112 using the software interface, the product keys 116 can connect with a software vendor license server or the license server 108 to validate the product keys 116 over the network 106. The software package or the software applications 112 can obtain or receive license limits 122 that apply to the licenses 114 of the users. The license limits 122 can be obtained from the license server 108, the e-commerce server 110, or a vendor's system.

For example, the license limits 122 can include a time limit. Also for example, the license limits 122 can enable product features of the software applications 112. Further, for example, the license limits 122 can optionally lock the licenses 114 to the users' systems including the computing device 102. Once the licenses 114 are activated, the licenses 114 can continue to work or can continue to be activated on the users' systems or machines with no further communication with the vendor's system.

FIG. 1 shows an extraction process 124, a notification transmission process 126, and a key transmission process 128. The extraction process 124 extracts unique device identifications 130, denoted as UDID, by the computing device 102. The notification transmission process 126 sends the unique device identifications 130 or their equivalents or derivatives. The notification transmission process 126 can generate and send notifications 132 from the e-commerce server 110 to the license server 108.

The key transmission process 128 sends the product keys 116 to the computing device 102. The extraction process 124, the notification transmission process 126, and the key transmission process 128 will subsequently be described in more details in FIGS. 2-8.

Earlier deficiencies and other problems associated with the earlier methods are overcome by the embodiments of the present invention. The embodiments of the present invention make a registration of the software package with the license server 108 automatic, without user interaction in terms of finding and inputting the product keys 116 into the software package.

Such method and system offer increased productivity, ease of use, and simplification of the user interaction when licensing and registering the software package. For example, the software applications 112 can be bundled with a hardware device, such as the network-connected device 104.

A growing need for an automated software registration method exists, whereby the users do not wait for the product keys 116 to arrive in an e-mail and then input the product keys 116 into the user interface to activate and register software. The earlier methods are rather manual and heavily dependent on human interaction of manually entering the product keys 116 into the software application interface, for example, by using a copy-and-paste and manual entry method. Unlike the earlier methods, the embodiments of the present invention provide automation so that software is automatically licensed when the users pay for the licenses 114 via an e-commerce provider using the e-commerce server 110.

In the embodiments of the present invention, the network-connected device 104 with a storage capacity for storing a number of files is provided. It has been noted that in the embodiments of the present invention, communication protocols suitable for removable media can be used for the network-connected device 104. For example, the communication protocols can include USB, Thunderbolt, and any other protocols.

The network-connected device 104 can be bundled with one or more of the software applications 112 that can include trial versions. The embodiments of the present invention provide the graphical user interface (GUI) for the users to buy the licenses 114 of the software applications 112. For example, the users can buy the licenses 114 by clicking on the "Buy Now" button, an "Activate" button, or other buttons in the GUI that allow the users to purchase or activate the licenses 114.

Upon connecting the network-connected device 104 to the computing device 102, the software applications 112 initially available for trial can run from the network-connected device 104. The software applications 112 can extract the unique device identifications 130 from the network-connected device 104, the computing device 102, or a combination thereof. Once authorized, the software applications 112 can be licensed to run on the network-connected device 104, the computing device 102, or a combination thereof.

The unique device identifications 130 can be sent to the e-commerce server 110. The users can also be redirected to the e-commerce server 110, where the users can purchase the licenses 114 by making electronic settlements 134. For example, the electronic settlements 134 can include online payments or any other forms of electronic payments.

Upon successful completion of the electronic settlements 134, the e-commerce server 110 can send the unique device identifications 130 and the notifications 132 to the license server 108. The unique device identifications 130, the product keys 116 associated with the unique device identifications 130, and other associated information can be encrypted and stored on the license server 108.

Referring now to FIG. 2, therein is shown a flow chart of a registration process 202 of the network information system 100 of FIG. 1. The registration process 202 can include the user interaction with the network information system 100. The registration process 202 can provide an automatic software license registration with the license server 108 of FIG. 1.

The network information system 100 can include a software execution module 204, an extraction module 206, a redirection module 208, a settlement module 210, and an activation module 212. The software execution module 204, the extraction module 206, the redirection module 208, the settlement module 210, and the activation module 212 can be used to implement the registration process 202.

The registration process 202 can begin when states 213 of the software applications 112 of FIG. 1 or hardware devices with licensing requirements and capabilities are in an unlicensed state. The software applications 112 can be bundled with the network-connected device 104 of FIG. 1. The states 213 of the software applications 112 can include an inactivated state. When the software applications 112 are in the inactivated states, a trial period 214 can be provided to the users to try out the software applications 112.

The trial period 214 is a duration in which the users are not charged for usage of the software applications 112. The trial period 214 can include any duration. For example, the trial period 214 can include a 30-day free trial.

The software execution module 204 enables the users to run the software applications 112 from or on the computing device 102 of FIG. 1. For example, the users can connect the network-connected device 104 to the computing device 102, and the software applications 112 on the network-connected device 104 can execute.

The software applications 112 running from the network-connected device 104 can provide the user interface. The user interface can be provided so that the users can be notified when the trial versions are expiring. The user interface can provide a method for the users to purchase the licenses 114 of FIG. 1 for the software applications 112.

The extraction module 206 enables the users to purchase the licenses 114. The users can click on the acquisition button 118 of FIG. 1. The software applications 112 can provide the user interface in which the users can purchase the licenses 114 for the software applications 112.

The redirection module 208 enables the users to be redirected to an e-commerce website. Vendors providing the software applications 112 can include an e-commerce function as part of the vendors' corporate websites.

The vendors can use a third party e-commerce website hosted by the e-commerce server 110 of FIG. 1. The third party e-commerce website can process the electronic settlements 134 of FIG. 1 and notify the vendors that the electronic settlements 134 are successful for the purchase of the licenses 114.

The settlement module 210 enables the users to make the electronic settlements 134 for the licenses 114. For example, the users can purchase the licenses 114 using a credit card or other methods of digital payment. As a specific example, the licenses 114 can be purchased by using PayPal or other online payment services.

The licenses 114 mentioned above can authorize usage of the software applications 112 on a number of network-connected devices 104. The unique device identifications 130 of FIG. 1 can include a unique serial number of the network-connected device 104 or of the computing device 102 to which the network-connected device 104 is connected. The unique serial number (or its equivalents or derivatives) is different from another unique serial number (or its equivalents or derivatives) and is used to identify each of the network-connected devices 104 or the computing device 102.

The activation module 212 enables the software applications 112 on the network-connected devices 104 to be activated and become fully licensed. The software applications 112 on the network-connected devices 104 can be activated and become fully licensed without any further user interaction.

Thus, unlike the earlier methods, the messages 120 of FIG. 1 with the product keys 116 of FIG. 1 may no longer need to be sent to the users because the software applications 112 have become fully licensed. In addition, the users may not need to locate the product keys 116 and input the product keys 116 accurately into the user interface of the software applications 112 in order to activate and register the software applications 112.

The modules described herein can be implemented in hardware or software. For example, the modules can be implemented as electronic circuitry, such as integrated circuits, discrete circuit, or a combination thereof. In another example, the modules can be implemented in software, such as software running on a dedicated processor, a microprocessor, co-processor, or a combination thereof.

The software execution module 204 can be implemented using the computing device 102, the network-connected device 104, or a combination thereof. The extraction module 206 can be implemented using the computing device 102, the network-connected device 104, or a combination thereof. The redirection module 208 can be implemented using the computing device 102, the network-connected device 104, the network 106 of FIG. 1, the e-commerce server 110, or a combination thereof.

The settlement module 210 can be implemented using the computing device 102, the network-connected device 104, the network 106, the e-commerce server 110, or a combination thereof. The activation module 212 can be implemented using the computing device 102, the network-connected device 104, the network 106, the license server 108, or a combination thereof.

The software execution module 204 can be coupled to the extraction module 206. The extraction module 206 can be coupled to the redirection module 208. The redirection module 208 can be coupled to the settlement module 210. The settlement module 210 can be coupled to the activation module 212.

It has been discovered that the unique device identifications 130 extracted from the network-connected device 104 with the software applications 112 installed and not activated on the network-connected device 104 improve reliability. The reliability is improved because the unique device identifications 130 are subsequently used to automatically activate the licenses 114 of the software applications 112 without user interaction and thus eliminating user errors.

It has also been discovered that the notifications 132 of FIG. 1 generated based on the unique device identifications 130 for sending to the license server 108 improve reliability. The reliability is improved because the notifications 132 are subsequently used to automatically activate the licenses 114 of the software applications 112 without user interaction and thus eliminating user errors.

It has further been discovered that the product keys 116 generated for the unique device identifications 130 based on the notifications 132 improve reliability. The reliability is improved because the product keys 116 are subsequently used to automatically activate the licenses 114 of the software applications 112 without user interaction and thus eliminating user errors.

It has yet further been discovered that the unique device identifications 130 having the unique serial number for encrypting on the license server 108 and for identifying the network-connected device 104 improve reliability. The reliability is improved because the unique device identifications 130 are subsequently used to automatically activate the licenses 114 of the software applications 112 without user interaction and thus eliminating user errors.

It has yet further been discovered that the product keys 116 stored on the network-connected device 104 improve reliability. The reliability is improved because the product keys 116 are used to successfully activate the licenses 114 of the software applications 112.

Referring now to FIG. 3, therein is shown a flow chart of the extraction process 124 of the network information system 100 of FIG. 1. The extraction process 124 is a method of extracting the unique device identifications 130 of FIG. 1 from the network-connected device 104 of FIG. 1 or the computing device 102 of FIG. 1 to which the network-connected device 104 is connected.

The network information system 100 can include the extraction module 206, an identification transmission application module 302, and a response application module 304. The extraction module 206, the identification transmission application module 302, and the response application module 304 can be used to implement the registration process 202 of FIG. 2.

The extraction process 124 can begin when the states 213 of FIG. 2 of the software applications 112 are in the unlicensed state. The software applications 112 can be bundled with the network-connected device 104. When the software applications 112 are in the unlicensed state, the software applications 112 are inactivated. The trial period 214 of FIG. 2 can be provided to the users to try out the software applications 112 with an option for the users to purchase or acquire the licenses 114 of FIG. 1 to fully activate the software applications 112.

The extraction module 206 enables the users to purchase the licenses 114. Upon the users clicking the acquisition button 118 of FIG. 1, the software applications 112 can generate or extract the unique device identifications 130. The unique device identifications 130 can be generated by taking into account one or more unique identifiers of the network-connected devices 104 or the computing device 102.

For example, the unique identifiers can include its serial numbers of the network-connected devices 104 or the computing device 102 to which the network-connected devices 104 are connected. Also for example, such unique identifiers extracted from the computing device 102 can include but are not limited to media access control (MAC) addresses, CPU serial numbers, etc.

A hash can be generated from one or more of the unique identifiers such that the hash represents the combination of the one or more of the unique identifiers according to a given algorithm. The unique device identifications 130 uniquely identify the computing device 102, the network-connected device 104, or a combination thereof.

The identification transmission application module 302 enables the unique device identifications 130 to be sent to the e-commerce server 110 of FIG. 1. The software applications 112 of FIG. 1 can send the unique device identifications 130 to the e-commerce server 110. The software applications 112 can send the unique device identifications 130 uniquely identifying the network-connected device 104 or the computing device 102 to the e-commerce server 110.

The response application module 304 enables the software applications 112 to wait for the license server 108 of FIG. 1 to respond to the software applications 112. The users can be redirected to the e-commerce server 110. The software applications 112 can wait for the users to purchase the licenses 114 and for the license server 108 to automatically activate the software applications 112.

The identification transmission application module 302 can be implemented using the computing device 102, the network-connected device 104, the network 106 of FIG. 1, the e-commerce server 110, or a combination thereof. The response application module 304 can be implemented using the computing device 102, the network-connected device 104, the network 106, the license server 108, the e-commerce server 110, or a combination thereof.

The extraction module 206 can be coupled to the identification transmission application module 302. The identification transmission application module 302 can be coupled to the response application module 304.

Referring now to FIG. 4, therein is shown a flow chart of the notification transmission process 126 of the network information system 100 of FIG. 1. The notification transmission process 126 is a method of sending the unique device identifications 130 of FIG. 1 and the notifications 132 of FIG. 1 from the e-commerce server 110 of FIG. 1 to the license server 108 of FIG. 1.

The network information system 100 can include a receiving e-commerce server module 402, a settlement interface module 404, a settlement process module 406, an identification transmission server module 408, and a response server module 410. The receiving e-commerce server module 402, the settlement interface module 404, the settlement process module 406, the identification transmission server module 408, and the response server module 410 can be used to implement the notification transmission process 126.

The receiving e-commerce server module 402 enables the e-commerce server 110 to receive the unique device identifications 130 from the software applications 112 of FIG. 1 on the network-connected device 104 of FIG. 1. The e-commerce server 110 can receive the unique device identifications 130 that have been extracted from the network-connected device 104 or the computing device 102 of FIG. 1 to which the network-connected device 104 is connected. The unique device identifications 130 uniquely identify the computing device 102, the network-connected device 104, or a combination thereof to the e-commerce server 110.

The settlement interface module 404 enables the e-commerce server 110 to provide the users with the user interface to make the electronic settlements 134 of FIG. 1 for the licenses 114 of FIG. 1 of the software applications 112. The e-commerce server 110 can provide the users with the acquisition button 118 of FIG. 1 on the user interface, using which the users can be able to click to make the electronic settlements 134. For example, the users can make the electronic settlements 134 to purchase the licenses 114 using a credit card or other methods of digital payment.

The settlement process module 406 processes the electronic settlements 134 and determines if the electronic settlements 134 are successful. The settlement process module 406 generates the notifications 132 to indicate that the electronic settlements 134 are successful submitted.

For example, the electronic settlements 134 are successfully made when the users use a credit card or other electronic payment methods to make the electronic settlements 134 to pay for the licenses 114. Also for example, the other electronic payment methods can include PayPal or other online payment methods.

The identification transmission server module 408 enables the e-commerce server 110 to send the unique device identifications 130 to the license server 108 along with the notifications 132 indicating that the electronic settlements 134 have been successfully submitted. The e-commerce server 110 can send information of the unique device identifications 130 and the notifications 132 in an encrypted form to protect the information.

The response server module 410 enables the e-commerce server 110 to wait for a response from the license server 108. The e-commerce server 110 can wait for the response from the license server 108 so that the e-commerce server 110 can send the messages 120 of FIG. 1 that include the product keys 116 of FIG. 1 generated by the license server 108 to the users on the computing device 102. The messages 120 with the product keys 116 can also function as a proof of purchase.

The receiving e-commerce server module 402 can be implemented using the computing device 102, the network-connected device 104, the network 106 of FIG. 1, the e-commerce server 110, or a combination thereof. The settlement interface module 404 can be implemented using the computing device 102, the network-connected device 104, the network 106, the e-commerce server 110, or a combination thereof. The settlement process module 406 can be implemented using the computing device 102, the network-connected device 104, the network 106, the license server 108, the e-commerce server 110, or a combination thereof.

The identification transmission server module 408 can be implemented using the computing device 102, the network-connected device 104, the network 106, the license server 108, the e-commerce server 110, or a combination thereof. The response server module 410 can be implemented using the computing device 102, the network-connected device 104, the network 106, the license server 108, the e-commerce server 110, or a combination thereof.

The identification transmission application module 302 of FIG. 3 can be coupled to the receiving e-commerce server module 402. The receiving e-commerce server module 402 can be coupled to the settlement interface module 404. The settlement interface module 404 can be coupled to the settlement process module 406. The settlement process module 406 can be coupled to the identification transmission server module 408. The identification transmission server module 408 can be coupled to the response server module 410.

Referring now to FIG. 5, therein is shown a flow chart of the key transmission process 128 of the network information system 100 of FIG. 1. The key transmission process 128 is a method of sending the product keys 116 of FIG. 1 from the license server 108 of FIG. 1 to the computing device 102 of FIG. 1.

The network information system 100 can include a receiving license server module 502, a key generation module 504, an information module 506, an application key transmission module 508, and a server key transmission module 510. The receiving license server module 502, the key generation module 504, the information module 506, the application key transmission module 508, and the server key transmission module 510 can be used to implement the key transmission process 128.

The receiving license server module 502 enables the license server 108 to receive the unique device identifications 130 of FIG. 1 along with the notifications 132 of FIG. 1 from the e-commerce server 110 of FIG. 1, whereby the notifications 132 indicate that the electronic settlements 134 of FIG. 1 are successful submitted. The license server 108 can receive the unique device identifications 130 and the notifications 132 in the encrypted form. The license server 108 can decrypt the unique device identifications 130 and the notifications 132 before proceeding to the next steps.

The key generation module 504 enables the license server 108 to generate the product keys 116 for the unique device identifications 130. For example, the license server 108 can generate the product keys 116 that are unique and can use an algorithm that uses the unique device identifications 130 for the generation of the product keys 116.

Also for example, the license server 108 can use the product keys 116 that are pre-generated based on predetermined information, such as a customer name, unique hardware or firmware attributes (or their revisions) of the network-connected device 104 of FIG. 1, computer systems including the computing device 102 to be used, etc. The predetermined information can be stored in an encrypted form in a database.

The information module 506 enables the license server 108 to save the unique device identifications 130 and the product keys 116 in a database, whereby the product keys 116 can be associated with the unique device identifications 130. For example, the license server 108 can save the product keys 116 that are uniquely generated and the unique device identifications 130 in a database.

Also for example, the license server 108 can associate the unique device identifications 130 with the product keys 116 that are pre-generated. The license server 108 can store the unique device identifications 130 along with the pre-generated product keys 116. Further, for example, the product keys 116 and the unique device identifications 130 can be stored in the encrypted form. Thus, the unique device identifications 130 and the product keys 116 can be uniquely bound to individual storage devices and/or computing devices.

The application key transmission module 508 enables the license server 108 to send the product keys 116 to the software applications 112 of FIG. 1 that are unlicensed on the network-connected device 104 connected to the computing device 102. For example, the license server 108 can send the product keys 116 that are uniquely generated to the software applications 112 running on the computing device 102, where the unique device identifications 130 can be generated.

Also for example, the license server 108 can send the product keys 116 that are pre-generated to the software applications 112 running on the computing device 102, where the unique device identifications 130 can be generated. Further, for example, the license server 108 can encrypt the product keys 116 when or before sending the product keys 116 to the software applications 112.

For example, the license server 108 can send the product keys 116 to the software applications 112 running from the network-connected device 104, and the software applications 112 can automatically be activated. Also for example, the license server 108 can send commands 512 to the software applications 112 running from the network-connected device 104 to change the states 213 of FIG. 2 of the software applications 112 from trial to fully licensed and activated.

Further, for example, the license server 108 can send the commands 512 to the software applications 112 running on the computing device 102 to toggle a software switch 514 in the software applications 112. The unique device identifications 130 can be generated on the computing device 102.

When the software switch 514 is in an "off" position or state, the software applications 112 can be in the unlicensed state or the inactivated state. When the software switch 514 is in an "on" position or state, the software applications 112 can be in a licensed state or an activated state.

The software switch 514 can be operated by having a variable that can be toggled between binary values "0" and "1" by receiving instructions or the commands 512 from the vendors of the software applications 112. The binary values "0" and "1" can be used to toggle the states 213 to the off state and the on states, respectively.

Thus, the electronic settlements 134 successfully made for the licenses 114 of FIG. 1 of the software applications 112 can trigger the license server 108 to send the commands 512 to the software applications 112. The commands 512 can be sent to toggle the software switch 514 from a binary value "0" to a binary value "1".

The server key transmission module 510 enables the license server 108 to send the product keys 116 to the e-commerce server 110. For example, the license server 108 can send the product keys 116 that are uniquely generated to the e-commerce server 110, which is waiting to send the messages 120 of FIG. 1 to the users, whereby the messages 120 can include the product keys 116.

Also for example, the license server 108 can send the product keys 116 that are pre-generated to the e-commerce server 110. Further, for example, the license server 108 can encrypt the product keys 116 and any other information that may be sent to the e-commerce server 110.

Yet further, for example, the license server 108 can store activation dates 516 of the software applications 112 and can start license duration counters 518, which are used to indicate durations when the licenses 114 are valid or activated. The licenses 114 can be valid or activated for any durations.

As a specific example, if the licenses 114 are valid for 2 years, then the licenses 114 can expire two years from the activation dates 516 of the software applications 112. The license duration counters 518 can be sub-components of the software applications 112 that can be installed on the network-connected device 104.

The receiving license server module 502 can be implemented using the network 106 of FIG. 1, the license server 108, the e-commerce server 110, or a combination thereof. The key generation module 504 can be implemented using the computing device 102, the network-connected device 104, the network 106, the license server 108, or a combination thereof. The information module 506 can be implemented using the computing device 102, the network-connected device 104, the network 106, the license server 108, or a combination thereof.

The application key transmission module 508 can be implemented using the computing device 102, the network-connected device 104, the network 106, the license server 108, the e-commerce server 110, or a combination thereof. The server key transmission module 510 can be implemented using the computing device 102, the network-connected device 104, the network 106, the license server 108, the e-commerce server 110, or a combination thereof.

The identification transmission server module 408 of FIG. 4 can be coupled to the receiving license server module 502. The receiving license server module 502 can be coupled to the key generation module 504. The key generation module 504 can be coupled to the information module 506. The information module 506 can be coupled to the application key transmission module 508. The application key transmission module 508 can be coupled to the server key transmission module 510.

Referring now to FIG. 6, therein is shown a flow chart of a key receiving process 602 of the network information system 100 of FIG. 1. The key receiving process 602 is a method of receiving the product keys 116 of FIG. 1 from the license server 108 of FIG. 1.

The network information system 100 can include a receiving application module 604, a key insertion module 606, and a software activation module 608. The receiving application module 604, the key insertion module 606, and the software activation module 608 can be used to implement the key receiving process 602.

The receiving application module 604 enables the software applications 112 of FIG. 1 on the network-connected device 104 of FIG. 1 to receive the product keys 116 from the license server 108, whereby the states 213 of FIG. 2 of the software applications 112 are in the unlicensed state or the inactivated state. For example, the software applications 112 on the network-connected device 104 that are unlicensed or inactivated can receive the product keys 116 from the license server 108. Also for example, the product keys 116 can be received in the encrypted form.

The key insertion module 606 enables the product keys 116 to be automatically inserted into the software applications 112. For example, the product keys 116 can be automatically inserted into the software applications 112. Also for example, when the product keys 116 are received in the encrypted form, the software applications 112 on the network-connected device 104 can decrypt the product keys 116 before inserting the product keys 116 automatically into the software applications 112.

Further, for example, there can be the software switch 514 of FIG. 5 in the software applications 112. When the software switch 514 is in the "off" position, the software applications 112 can be in the unlicensed state or the inactivated state. When the software switch 514 is in the "on" position, the software applications 112 can be in the licensed state or the activated state.

The software switch 514 can be operated by having the variable that can be toggled between binary values "0" and "1" by receiving the instructions or the commands 512 of FIG. 5 from the vendors of the software applications 112. Thus, the electronic settlements 134 of FIG. 1 successfully made for the licenses 114 of FIG. 1 of the software applications 112 can trigger the vendors of the software applications 112 or the license server 108 to send the commands 512. The commands 512 can be sent to the software applications 112 to toggle the software switch 514 from the off state to the on state.

The software activation module 608 enables the states 213 of the software applications 112 to become fully licensed. For example, the automatic insertion of the product keys 116 into the software applications 112 can fully activate the software applications 112 and make the software applications 112 fully licensed.

Also for example, upon receiving the instructions or the commands 512 from the license server 108, the software switch 514 can be automatically toggled from the off state to the on state, making the software applications 112 fully licensed. Further, for example, the software applications 112, which are preloaded on the network-connected device 104 and now fully licensed, can generate and show confirmation messages 610, confirmation symbols 612, or a combination thereof.

The confirmation messages 610 are information indicating that the software applications 112 are activated or fully licensed. The confirmation symbols 612 are information indicating that the software applications 112 are activated or fully licensed.

The confirmation messages 610 or the confirmation symbols 612 can be shown or displayed along with license durations 614 and assignment names 616 of persons or companies to which the product keys 116 are assigned. The license durations 614 of the licenses 114 can be different among the licenses 114. The confirmation messages 610 or the confirmation symbols 612 can be generated or shown after the software switch 514 is toggled.

For example, if the users reformat the network-connected device 104 or the network-connected device 104 become corrupted and thus lose the software applications 112 that are licensed and were running from the network-connected device 104, the licenses 114 of the software applications 112 can be re-activated, restored, or recovered. The licenses 114 can be re-activated, restored, or recovered upon downloading new trial versions of the software applications 112 when the software applications 112 connect with the license server 108.

The licenses 114 can be automatically re-activated, restored, or recovered so that the software applications 112 can subsequently be fully licensed. The licenses 114 can be automatically re-activated, restored, or recovered because the licenses 114 are uniquely bound to or associated with the unique device identifications 130 of FIG. 1 of the network-connected devices 104.

Thus, the licenses 114 can be automatically re-activated, restored, or recovered without having the users providing user identification information to get the product keys 116 to activate freshly installed trial versions or the new trial versions. For example, the user identification information can include names, e-mail addresses, etc.

The receiving application module 604 can be implemented using the computing device 102 of FIG. 1, the network-connected device 104, the network 106 of FIG. 1, the license server 108, or a combination thereof. The key insertion module 606 can be implemented using the computing device 102, the network-connected device 104, the network 106, the license server 108, or a combination thereof. The software activation module 608 can be implemented using the computing device 102, the network-connected device 104, the network 106, the license server 108, or a combination thereof.

The application key transmission module 508 of FIG. 5 can be coupled to the receiving application module 604. The receiving application module 604 can be coupled to the key insertion module 606. The key insertion module 606 can be coupled to the software activation module 608.

It has been discovered that the licenses 114 uniquely bound to or associated with the unique device identifications 130 improve reliability. The reliability is improved because the licenses 114 are automatically re-activated, restored, or recovered without having the users providing the user identification information, thereby eliminating user interaction that is prone to human errors.

It has also been discovered that the confirmation messages 610 for indicating that the software applications 112 are activated improves security. The security is improved because the confirmation messages 610 ensure that the software applications 112 have been successfully activated before the software applications 112 are fully licensed and run on the computing device 102.

Referring now to FIG. 7, therein is shown a flow chart of an identification process 702 of the network information system 100 of FIG. 1. The identification process 702 is a method of identifying vendor information to determine license information.

The network information system 100 can include a device check module 704, a vendor information transmission module 706, an inquiry module 708, and a display module 710. The device check module 704, the vendor information transmission module 706, the inquiry module 708, and the display module 710 can be used to implement the identification process 702.

The identification process 702 can be used to associate different prices and different license durations with different vendors or different products from the same vendor. Different vendors can manufacture the network-connected device 104 of FIG. 1 and can package the trial versions of the software applications 112 of FIG. 1 with the network-connected device 104. Each of the vendors can have a different marketing strategy. Thus, each of the vendors can offer a different price point for the same software application.

The device check module 704 enables the software applications 112 on the network-connected device 104 to check product identities 712, vendor identities 714, and device revisions 716 of the network-connected devices 104. The product identities 712, the vendor identities 714, and the device revisions 716 are denoted as PID, VID, and REV, respectively.

For example, the software applications 112 on the network-connected devices 104 can check the product identities 712, the vendor identities 714, and the device revisions 716 of the network-connected devices 104. As a specific example, for the network-connected devices 104 including USB devices, the vendor identities 714 can be obtained from the USB Implementers Forum at www.usb.org.

The USB Implementers Forum is a non-profit corporation founded by a group of companies that develop the USB specification. USB is an industry standard that defines cables, connectors, and communications protocols used in a bus for connection, communication, and power supply between computers and electronic devices.

The product identities 712 can be assigned and maintained by the vendors, who own the product identities 712. The product identities 712 can be used to distinguish between different products under a single VID. The product identities 712 can be at the discretion of the vendors.

The device revisions 716 can be used as part of a configuration management control. The device revisions 716 can be used to distinguish between multiple devices, which have the same VID and PID.

The vendor information transmission module 706 enables the software applications 112 to send the product identities 712, the vendor identities 714, and the device revisions 716 to the e-commerce server 110 of FIG. 1. The product identities 712, the vendor identities 714, and the device revisions 716 can be sent along with the unique device identifications 130 of FIG. 1 of the network-connected device 104, the computing device 102 of FIG. 1, or a combination thereof.

For example, the software applications 112 can send the product identities 712, the vendor identities 714, and the device revisions 716 extracted from the network-connected device 104 to the e-commerce server 110. Also for example, the product identities 712, the vendor identities 714, and the device revisions 716 can be encrypted to protect the product identities 712, the vendor identities 714, and the device revisions 716.

The inquiry module 708 enables the e-commerce server 110 to query a vendor information table 718. The vendor information table 718 can include information about settlement values 720 and the license durations 614 of FIG. 6 that are associated with the licenses 114 of FIG. 1 for the software applications 112 on the network-connected device 104. The settlement values 720 are numerical values. The settlement values 720 are used for settlement when acquiring the licenses 114.

For example, the settlement values 720 can include prices that are paid when purchasing the licenses 114. Also for example, the e-commerce server 110 can receive the product identities 712, the vendor identities 714, and the device revisions 716 of the network-connected device 104.

The e-commerce server 110 can query the vendor information table 718 that stores the information about different vendors, their products, revisions, associated license prices, and different durations of the licenses 114 associated with the product identities 712, the vendor identities 714, and the device revisions 716. The products, the vendors, the revisions, the license prices, and the durations can be identified by the product identities 712, the vendor identities 714, the device revisions 716, the settlement values 720, and the license durations 614, respectively.

The display module 710 enables the e-commerce server 110 to display the settlement values 720 and the license durations 614 on the video display of the computing device 102. The settlement values 720 and the license durations 614 can be associated with the product identities 712, the vendor identities 714, and the device revisions 716 of the network-connected device 104.

The physical transformation of extracting the unique device identifications 130 for sending to the e-commerce server 110 results in movement in the physical world, such as people using the computing device 102, the network-connected device 104, the network 106 of FIG. 1, the license server 108 of FIG. 1, the e-commerce server 110, and the software applications 112 based on the operation of the network information system 100. As the movement in the physical world occurs, the movement itself creates additional information that is converted back to the data for generating the notifications 132 of FIG. 1 and the product keys 116 of FIG. 1 for the unique device identifications 130 for the continued operation of the network information system 100 and to continue the movement in the physical world.

The device check module 704 can be implemented using the computing device 102, the network-connected device 104, the network 106, the license server 108, the e-commerce server 110, or a combination thereof. The vendor information transmission module 706 can be implemented using the computing device 102, the network-connected device 104, the network 106, the license server 108, the e-commerce server 110, or a combination thereof.

The inquiry module 708 can be implemented using the computing device 102, the network-connected device 104, the network 106, the license server 108, the e-commerce server 110, or a combination thereof. The display module 710 can be implemented using the computing device 102, the network-connected device 104, the network 106, the license server 108, the e-commerce server 110, the video display, or a combination thereof.

The device check module 704 can be coupled to the vendor information transmission module 706. The vendor information transmission module 706 can be coupled to the inquiry module 708. The inquiry module 708 can be coupled to the display module 710.

It has been discovered that the vendor information table 718 improves reliability. The reliability is improved because the vendor information table 718 includes the product identities 712, the vendor identities 714, the device revisions 716, the settlement values 720, and the license durations 614, which are used to successfully activate the licenses 114.

Referring now to FIG. 8, therein is shown an example of the vendor information table 718. The example shows different PIDs, VIDs, and REVs of different storage devices, associated prices, and associated license durations.

The vendor information table 718 can store the product identities 712, the vendor identities 714, and the device revisions 716. The vendor information table 718 can store associated information including the settlement values 720 for the licenses 114 of FIG. 1 of the software applications 112 of FIG. 1 and the license durations 614 of the software applications 112.

For example, the vendor information table 718 can be stored in a database at the e-commerce server 110 of FIG. 1. Also for example, the software applications 112 can incorporate a capability to generate or extract the unique device identifications 130 of FIG. 1 from the network-connected device 104 of FIG. 1 or the computing device 102 of FIG. 1. Further, for example, the e-commerce server 110 can send the unique device identifications 130 or its associated representation to the license server 108 of FIG. 1 along with the notifications 132 of FIG. 1 indicating that the electronic settlements 134 of FIG. 1 are successful submitted.

Yet further, for example, the product keys 116 of FIG. 1 received from the license server 108 can be stored on the network-connected device 104, the computing device 102, or a combination thereof. Yet further, for example, the product keys 116 can include information about pre-authorized quantities, production batches, and the license durations 614.

It has been discovered that using the methods of the embodiments of the present invention, as disclosed in this application, automated software application activation and registration can be achieved. The achieved methods are easy to use with no interaction from the users, save time and money, and increase overall productivity.

It has been noted that the embodiments of the present invention are not limited to the examples described above.

It has also been noted that the embodiments can cover all possible network-connected devices and computer systems that are available in the market today or will become available in the future as the computing industry evolves over time. It has further been noted that the embodiments can also cover all such combinations and permutations not listed herein. The above examples are not limiting, but are illustrative and exemplary.

It is to be understood that although the term "application" has been used as an example in this disclosure, in essence the term can also apply to any other pieces of software application codes where the embodiments of the present invention are incorporated. The software application codes can be implemented in a standalone configuration or in combination with other software application programs and are not limited to any particular operating systems or programming paradigms described here. Thus, the embodiments of the present invention are intended to cover all applications and user interactions described above.

In one embodiment of the present invention, the software applications 112 can be licensed based on the UDID or other methods. In other embodiments of the present invention, applications of the embodiments of the present invention can include an update function, a reset function, a license recovery function, and other such features incorporated in the embodiments.

The program code can include a computer usable program code for graphically presenting to the users options for scrolling via a touch-screen interface on the video display. The software applications 112 can perform different functions.

For example, the functions can include backing up data to a computer and/or to a cloud backup service provider, synchronizing content between portable media and connected computers and/or clouds, scanning and cleaning computers from malware and viruses. Also for example, the functions can include extracting certain type of files from the connected computers and safely storing them on the portable media, and encrypting data on the portable media, on the connected computer, or on the fly before the data gets transferred to a cloud, etc.

Referring now to FIG. 9, therein is shown a flow chart of a method 900 of operation of a network information system in a further embodiment of the present invention. The method 900 includes: extracting a unique device identification for sending to an e-commerce server, wherein the unique device identification is extracted from a network-connected device with a software application installed and not activated on the network-connected device in a block 902; generating a notification based on the unique device identification for sending to a license server in a block 904; and generating a product key for the unique device identification based on the notification for activating the software application to run on a computing device in a block 906.

The modules in one of the processes described above can interface with any modules in another of the processes. For example, the modules in the registration process 202 of FIG. 2 can interface with the modules in the identification process 702 of FIG. 7. As a specific example, the software execution module 204 of FIG. 2 can be coupled and thus interface with the device check module 704 of FIG. 7.

It has been found that the network information system provides the previously described advantages that provide solutions to problems of ever-increasing commercial competitive pressures along with growing consumer expectations. Solutions to these problems have been long sought but prior developments have not taught or suggested any solutions and, thus, solutions to these problems have long eluded those skilled in the art.

Thus, it has been discovered that the network information system of the embodiments of the present invention furnish important and heretofore unknown and unavailable solutions, capabilities, and functional aspects for the network information system with the license registration. The resulting method, process, apparatus, device, product, and/or system is straightforward, cost-effective, uncomplicated, highly versatile and effective, can be surprisingly and unobviously implemented by adapting known technologies, and are thus readily suited for efficiently and economically manufacturing network information systems fully compatible with conventional manufacturing methods or processes and technologies.

Another important aspect of the embodiments of the present invention is that it valuably supports and services the historical trend of reducing costs, simplifying systems, and increasing performance.

These and other valuable aspects of the embodiments of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hitherto set forth herein or shown in the accompanying drawings are to be interpreted in an illustrative and non-limiting sense.

What is claimed is:

1. A method of operation of a network information system comprising:
   extracting a unique device identification for sending to an e-commerce server, wherein the unique device identification is extracted from a network-connected device coupled to a computer device, the network-connected device having a software application installed and not activated on the network-connected device;
   generating a notification based on the extracted unique device identification for sending to a license server to request a product key for activating the installed software application; and
   generating, in response to the request, the product key, by the license server, based on the extracted unique device identification and the notification for activating the software application to run on a computing device.

2. The method as claimed in claim 1 wherein extracting the unique device identification includes extracting the unique device identification from a network-connectable storage.

3. The method as claimed in claim 1 wherein extracting the unique device identification includes extracting the unique device identification from the network-connected device with an embedded software application running in the network-connected device.

4. The method as claimed in claim 1 wherein extracting the unique device identification includes extracting the unique device identification having a unique serial number for encrypting on the license server and for identifying the network-connected device.

5. The method as claimed in claim 1 further comprising sending the product key for storing in the network-connected device.

6. The method as claimed in claim 1 further comprising generating a confirmation message for indicating the software application is activated.

7. The method as claimed in claim 1 further comprising querying a vendor information table for displaying on the computing device, the vendor information table associated with the network-connected device.

8. A method of operation of a network information system comprising:
   extracting a unique device identification for sending to an e-commerce server on a network, wherein the unique device identification is extracted from a network-connected device coupled to a computer device, the network-connected device having a software application installed and not activated on the network-connected device;
   generating a notification based on the extracted unique device identification for sending to a license server on the network to request a product key for activating the installed software application; and
   generating, in response to the request, the product key, by the license server, based on the extracted unique device identification and the notification for activating the software application to run on the computing device.

9. The method as claimed in claim 8 wherein extracting the unique device identification includes extracting the unique device identification having a unique serial number for encrypting and storing on the license server and for identifying the network-connected device, the computing device, or a combination thereof.

10. The method as claimed in claim 8 further comprising sending the product key having an encoded unique sequence of alphanumeric characters for storing in the network-connected device.

11. The method as claimed in claim 8 further comprising:
    toggling a software switch for changing a state of the software application from off to on; and
    generating a confirmation message based on the software switch for indicating the software application is activated.

12. The method as claimed in claim 8 further comprising querying a vendor information table for displaying on the computing device, the vendor information table associated with the network-connected device and having a product identity, a vendor identity, and a device revision.

13. A network information system comprising:
    at least one hardware processor configured for an extraction module for extracting a unique device identification for sending to an e-commerce server, wherein the unique device identification is extracted from a network-connected device coupled to a computer device, the network-connected device having a software application installed and not activated on the network-connected device;
    a settlement process module, coupled to the extraction module, for generating a notification based on the extracted unique device identification for sending to a license server to request a product key for activating the installed software application; and
    a key generation module, coupled to the settlement process module, for generating, in response to a request, a product key, by the license server, based on the extracted unique device identification and the notification for activating the software application to run on the computing device.

14. The system as claimed in claim 13 wherein the extraction module is for extracting the unique device identification from a network-connectable storage.

15. The system as claimed in claim 13 wherein the extraction module is for extracting the unique device identification from the network-connected device with an embedded software application running in the network-connected device.

16. The system as claimed in claim 13 wherein the extraction module is for extracting the unique device identification having a unique serial number for encrypting on the license server and for identifying the network-connected device.

17. The system as claimed in claim 13 further comprising an application key transmission module, coupled to the key generation module, for sending the product key for storing in the network-connected device.

18. The system as claimed in claim 13 further comprising a software activation module, coupled to the key generation module, for generating a confirmation message for indicating the software application is activated.

19. The system as claimed in claim 13 further comprising an inquiry module, coupled to the settlement process module, for querying a vendor information table for displaying on the computing device, the vendor information table associated with the network-connected device.

20. The system as claimed in claim 13 wherein the extraction module is for extracting the unique device identification from the network-connected device.

21. The system as claimed in claim 20 wherein the extraction module is for extracting the unique device identification from a network-connectable storage device.

22. The system as claimed in claim 20 wherein the extraction module is for extracting the unique device identification having a unique serial number for encrypting and storing on the license server and for identifying the network-connected device, the computing device, or a combination thereof.

23. The system as claimed in claim 20 further comprising an application key transmission module, coupled to the key generation module, for sending the product key having an encoded unique sequence of alphanumeric characters for storing in the network-connected device.

24. The system as claimed in claim 20 further comprising a software activation module, coupled to the key generation module, for toggling a software switch for changing a state of the software application from off to on and for generating a confirmation message based on the software switch for indicating the software application is activated.

25. The system as claimed in claim 20 further comprising an inquiry module, coupled to the settlement process module, for querying a vendor information table for displaying on the computing device, the vendor information table associated with the network-connected device and having a product identity, a vendor identity, and a device revision.

\* \* \* \* \*

UNITED STATES PATENT AND TRADEMARK OFFICE
CERTIFICATE OF CORRECTION

PATENT NO. : 9,536,060 B2  
APPLICATION NO. : 14/624879  
DATED : January 3, 2017  
INVENTOR(S) : Lemelev et al.

Page 1 of 1

It is certified that error appears in the above-identified patent and that said Letters Patent is hereby corrected as shown below:

In the Claims

In Column 21, Line 40, in Claim 1, delete "computer" and insert --computing-- therefor In Column 21, Line 50, in Claim 1, delete "a" and insert --the-- therefor In Column 22, Line 13, in Claim 8, delete "computer" and insert --computing-- therefor In Column 22, Line 53, in Claim 13, delete "computer" and insert --computing-- therefor In Column 22, Line 63, in Claim 13, delete "a" and insert --the-- therefor Signed and Sealed this  
Third Day of April, 2018

Andrei Iancu  
*Director of the United States Patent and Trademark Office*